United States Patent
Kobayashi et al.

(10) Patent No.: US 6,457,113 B1
(45) Date of Patent: Sep. 24, 2002

(54) MEMORY MANAGEMENT APPARATUS IN A MULTI-CHANNEL SIGNAL PROCESSOR

(75) Inventors: Noboru Kobayashi; Naoji Fujino; Hideaki Kurihara; Fumiaki Nishida, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 26 days.

(21) Appl. No.: 09/625,703

(22) Filed: Jul. 25, 2000

(30) Foreign Application Priority Data

Oct. 15, 1999 (JP) .......................................... 11-293663

(51) Int. Cl.⁷ .............................................. G06F 12/00
(52) U.S. Cl. ........................ 711/200; 711/145; 711/154; 711/220
(58) Field of Search .................................... 711/100, 145, 711/149, 154, 200, 220; 712/200

(56) References Cited

U.S. PATENT DOCUMENTS

| | | | |
|---|---|---|---|
| 4,901,230 A | * 2/1990 | Chen et al. ................. | 711/149 |
| 5,247,675 A | * 9/1993 | Farrell et al. ............... | 709/103 |
| 5,490,263 A | * 2/1996 | Hashemi .................... | 711/149 |
| 5,659,690 A | * 8/1997 | Stuber et al. ............... | 710/129 |
| 5,838,950 A | * 11/1998 | Young et al. .......... | 395/500.42 |
| 5,920,714 A | * 7/1999 | Schiffleger ................. | 711/155 |
| 6,012,135 A | * 1/2000 | Leedom et al. ............. | 711/208 |

* cited by examiner

Primary Examiner—Tuan V. Thai
(74) Attorney, Agent, or Firm—Katten Muchin Zavis Rosenman

(57) ABSTRACT

A multi-channel signal processing apparatus comprises a memory unit, a signal processing unit for single-channel implementing predetermined signal processing using a memory region of the memory unit according to a signal processing program for single-channel, an address generation unit generating a first memory address for single-channel processing, a pointer adding unit adding a pointer value indicating the head of an unused memory region of the memory unit to the first memory address generated by the address generation unit each time the signal processing in the signal processing unit is completed to generate a second memory address, and an address selecting unit selecting either the first memory address or the second memory address as a real address for the memory unit, thereby enabling multi-channel signal processing having a high processing efficiency without adding a large modification to the signal processing program for single-channel.

4 Claims, 5 Drawing Sheets

MEMORY MANAGEMENT APPARATUS IN A MULTI-CHANNEL SIGNAL PROCESSOR

BACKGROUND OF THE INVENTION (1) Field of the Invention

The present invention relates to a multi-channel signal processing apparatus suitable for use in signal processing implemented on signals on a plurality of channels.

(2) Description of Related Art

When a firmware (signal processing apparatus) for processing signals such as voice signals is developed with a DSP (Digital Signal Processor), it is general that one DSP is assigned to signals on one channel and the processing is implemented since a processing performance of a known DSP has a limitation in processing of only one channel.

In recent years, a processing performance of one DSP is far progressed owing to contrivance and advance of the semiconductor technique and architecture (similar to parallelizing), it is thereby possible to implement processing of a plurality of (multi) channels by one DSP. A DSP capable of such multi-channel processing is used in an apparatus in an infra-system that collectively processes information (channel signals) from a number of terminals such as a base station apparatus in a mobile communication system for portable phones, etc., for example.

To realize such a multi-channel processing DSP (firmware), it is necessary that signal processing of a certain channel does not affect signal processing of another channel (interchannel interference). In concrete, it is desirable that a memory region that is being used by a certain channel is not doubly used by another channel.

Namely, when realizing a DSP firmware for multi-channel processing, it is necessary to describe (create) a program in consideration of a problem of interchannel interference including a decision on memory allocation for each channel, etc.

On the other hand, processing of each (single) channel is widely distributed as a processor core, which is an established technique because of its easy verification. For this, when implementing multi-channel processing, it is a shorter way to realization of a reliable, efficient program to modify the processing of individual channels as less as possible and implement the same.

When a processor core for single-channel (hereinafter referred to as a single-channel core) is adapted to the multi-channel processing, there can be two kinds of manners as below:

① copying individual data of each channel (channel's individual data) in a memory region for a single-channel core, then implementing the processing, and restoring (copying-back) a result of the processing to the original region after completion of the processing; and ② describing a program such that a memory region for a single-channel core can be set for each channel.

However, in the above manner ①, a process of copying and copying-back data of channel's individual data is required when processing of each channel is switched, which leads to degrade of the processing efficiency. In the above manner ②, it is necessary to set a pointer for data access after explicitly referring to a location of channel's individual data at the time of each access to the memory region, leading to a complicated program and degradation of the program efficiency. Such degradation of the program efficiency causes not only an increase of the number of DSPs and an increase of the apparatus cost but also an increase of power consumption when the identical functions are implemented.

In signal processing performed by a DSP, there sometimes exists processing (for example, system processing by interruption or the like) that can be common to every channel without necessity to be implemented for each channel. However, when taking the processing common to every channel into consideration in the above manners ① and ②, it leads to an increase of the number of times of a process of copying and copying-back or a further complicated program.

SUMMARY OF THE INVENTION

In the light of the above problems, an object of the present invention is to provide a multi-channel signal processing apparatus enabling highly-efficient multi-channel signal processing without largely modifying a signal processing program for single-channel.

The present invention therefore provides a multi-channel signal processing apparatus comprising a memory unit, a signal processing unit for single-channel for implementing predetermined signal processing using a memory region of the memory unit according to a signal processing program for single-channel, an address generation unit for single-channel for generating a first memory address for single-channel processing according to the signal processing program, a pointer adding unit for adding a pointer value indicating the head of an unused memory region of the memory unit to the first memory address generated by the address generation unit each time the signal processing in the signal processing unit is completed to generate a second memory address, and an address selecting unit for selecting either the first memory address or the second memory address as a real address for the memory unit.

Therefore, the multi-channel signal processing apparatus according to this invention enjoys the following advantages:

① Implementation of the multi-channel signal processing is possible using a program for single-channel processing as it is, whereby a reliable, efficient multi-channel signal processing apparatus is realized at a low cost.

② Since a memory use region in a necessary size is successively arranged for each channel, it is possible to avoid in advance an interference problem of memory use regions unaware of detailed region arrangement (memory allocation) when a program is created even if a size of a memory use region necessary for each channel is different.

③ It is unnecessary to copy and copy-back data as done heretofore, so that there is no decrease of the processing efficiency due to multi-channelization.

④ When processing that is sufficient to be performed commonly to every channel is implemented, a memory address for single-channel generated by the address generation unit is selected as it is as a real address of the memory unit by the address selecting unit, and a memory use region is fixed to an area other than the memory use area for the multi-channel processing. Therefore, it is possible to cope with the processing common to every channel without adding modification to the program for single-channel processing.

The present invention further provides a multi-channel signal processing apparatus comprising a memory unit, a signal processing unit for single-channel for implementing predetermined signal processing using a memory region of the memory unit according to a signal processing program for single-channel, an address generation unit for single-channel for generating a first memory address for single-channel processing according to the signal processing program, and a pointer adding unit for providing a second memory address obtained by adding a pointer value indicating the head of an unused memory region of the memory unit to the first memory address generated by the address generation unit each time the signal processing in the signal processing unit is completed as a real address for the memory unit.

Namely, it is possible to omit the above address selecting unit to use the above second memory address as a real address. In which case, the advantages ① to ③ described above are attained with the above pointer value.

Other objects and further features of the present invention will be apparent from the following detailed description when read in conjunction with the accompanying drawings.

DESCRIPTION OF THE PREFERRED EMBODIMENTS

(A) Description of an Aspect of the Invention

Figure 1:
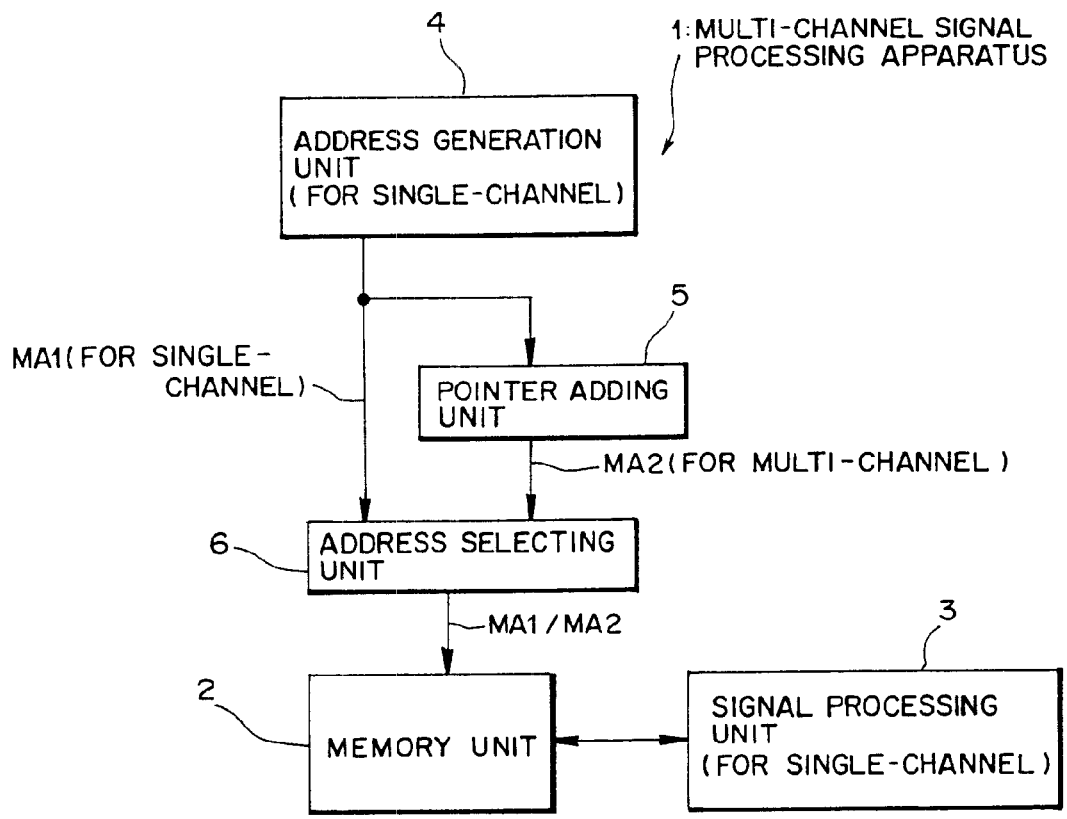
FIG. 1 is a block diagram showing an aspect of this invention.

FIG. 1 is a block diagram showing an aspect of this invention. A multi-channel signal processing apparatus 1 (hereinafter referred to simply as a signal processing apparatus 1, occasionally) comprises a memory unit 2, a signal processing unit 3 for single-channel, an address generation unit 4 for single-channel, a pointer adding unit 5 and an address selecting unit 6.

The signal processing unit 3 performs predetermined signal processing using a memory region in the memory unit 2 according to a signal processing program for single-channel. The address generation unit 4 generates a first memory address MA1 for single-channel processing according to the above signal processing program.

The pointer adding unit 5 adds a pointer value indicating the head of an unused memory region in the memory unit 2 to the first memory address MA1 generated by the address generation unit 4 each time the signal processing in the signal processing unit 3 is completed to generate a second memory address MA2. The address selecting unit 6 selects either the first memory address MA1 or the second memory addresses MA2 as a real address for the memory unit 2.

In the signal processing apparatus 1 according to this invention having the above structure, either the first memory address MA1 generated by the address generation unit 4 according to the signal processing program for single-channel or the second memory address MA2 for multi-channel processing obtained by adding the above pointer value to the first memory address by the pointer adding unit 5 is selected by the address selecting unit 6 to be a real address for the memory unit 2.

When the second memory address MA2 is selected, use regions (access regions) of the memory unit 2 are such arranged as not to be overlapped (interfered) with one another by adding the above pointer value each time the signal processing is completed. This enables efficient multi-channel signal processing avoiding an interference problem of memory use regions, without adding modification to the signal processing program for single-channel.

When the first memory address MA1 is selected, a use region of the memory unit 2 is fixed to a region other than the memory use region at the time that the second memory address MS2 is selected, so that processing common to every channel that is not required to be performed for each channel is implemented using this area.

Accordingly, the multi-channel signal processing apparatus of this invention enjoys the following advantages.

① Implementation of the multi-channel signal processing is possible using a program for single-channel processing as it is, whereby a reliable, efficient multi-channel signal processing apparatus 1 is realized at a low cost.

② Since a memory use region in a necessary size is successively arranged for each channel, it is possible to avoid in advance an interference problem of memory use regions unaware of detailed region arrangement (memory allocation) when a program is created even if a size of a memory use region necessary for each channel is different.

③ It is unnecessary to copy and copy-back data as done heretofore, so that there is no decrease of the processing efficiency due to multi-channelization.

④ When processing that is sufficient to be performed commonly to every channel is implemented, a first memory address MA1 is selected as it is as a real address of the memory unit 2 by the address selecting unit 6, and a memory use region is fixed to an area other than the memory use area for the multi-channel processing. Therefore, it is possible to cope with the processing common to every channel without adding modification to the program for single-channel processing.

The above address generation unit 4 may be such configured as to set setting information indicating a setting of single or multi-channel processing at the first memory address MA1. In which case, the address selecting unit 6 implements the above address selection according to the setting information set at the first memory address MA1. It is thereby possible to switch the single/multi-channel processing only by referring to the first memory address generated by the address generation unit 4.

In concrete, when the above setting information is set at the most significant bit of a first memory address MA1 by the address generation unit 4, the most significant bit is a switching bit for the single or multi-processing, thus the switching control becomes easy.

Namely, if selection (switching) of a memory address is accomplished by setting the setting information indicating a setting of the single or multi-channel processing at a memory address MA1 (for example, the most significant bit) generated by the address generation unit 4, the address selecting unit 6 can select the above address only by referring to the memory address MA1 (the most significant bit). Whereby, a control on a switching between the processing common to every channel and the multi-channel processing is possible with a very simple structure.

Incidentally, the above address selecting unit 6 may be omitted. In other words, the second memory address MA2 obtained by adding the above pointer value to the first memory address MA1 generated by the address generation unit 4 may be used as it is as a real address for the memory 2. In such case, the multi-channel processing in which the interference problem of memory use regions is solved is possible without adding any modification to the signal processing program for single-channel, since the use regions in the memory unit 2 are such arranged as not to be overlapped with one another each time the signal processing is completed.

Accordingly, advantages similar to the above described ① to ③ are attained.

(B) Description of an Embodiment of the Invention

Hereinafter, description will be made of an embodiment of this invention with reference to the drawings.

Figure 2:
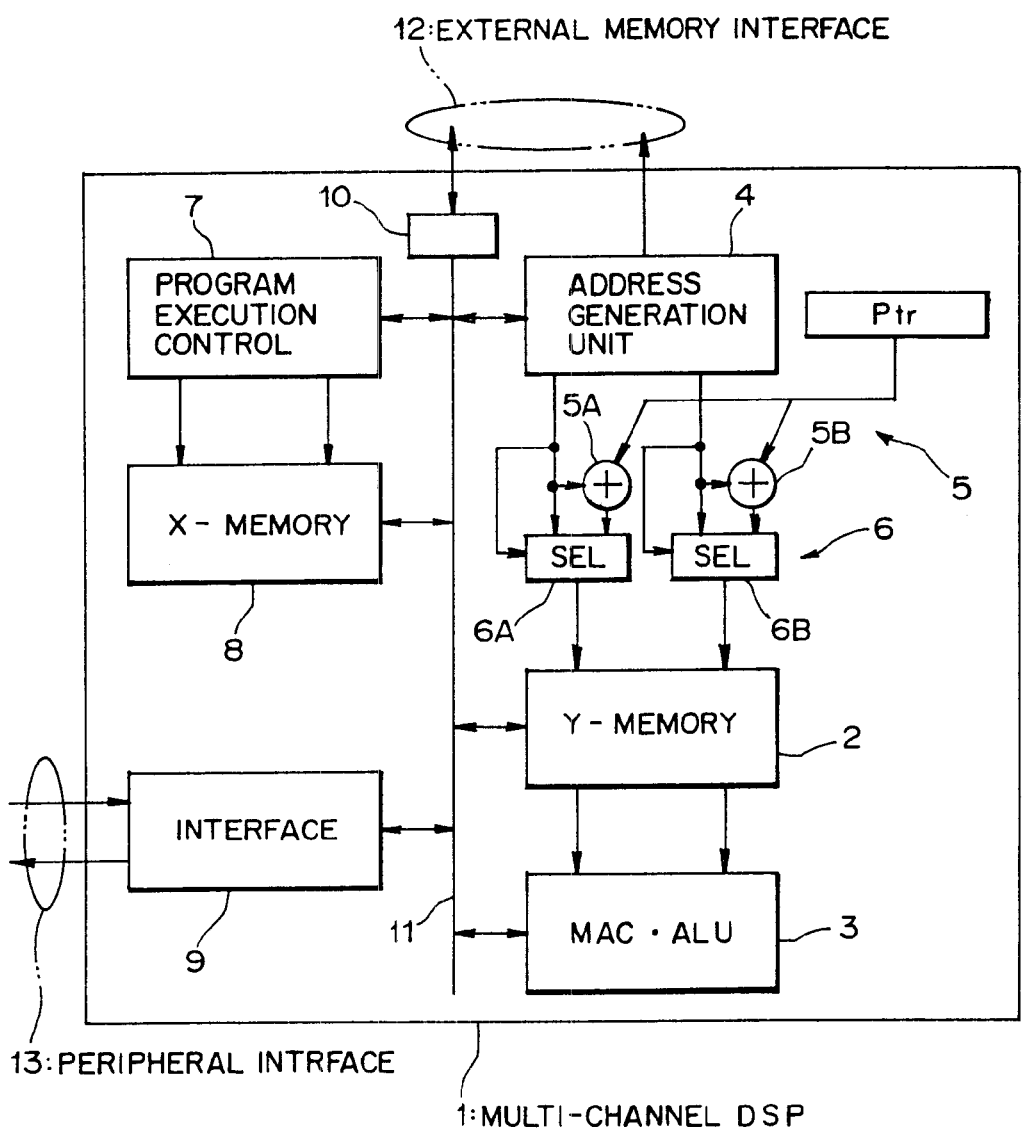
FIG. 2 is a block diagram showing a structure of a multi-channel DSP (multi-channel signal processing apparatus) according to an embodiment of this invention.

FIG. 2 is a block diagram showing a structure of a multi-channel DSP (multi-channel signal processing apparatus) according to an embodiment of this invention. The multi-channel DSP 1 (hereinafter referred to simply as a DSP 1) shown in FIG. 2 comprises a data memory (Y-Memory) 2, an MAC·ALU (Multiplier and ACcumlator·Arithmetic Logic Unit) 3, an address generation unit (AGU) 4, a pointer adding unit 5, an address selecting unit 6, a program execution control (PEC) unit 7, an instruction memory (X-memory) 8, and interfaces 9 and 10.

In FIG. 2, reference numeral 11 denotes a bus (line) that enables mutual accesses among the data memory 2, the instruction memory 8, the MAC·ALU 3, the AGU 4, the interfaces 9 and 10, with the PEC unit 7 as a center. Reference numeral 12 denotes an external memory interface that enables a mutual access to an external memory (not shown). Reference numeral 13 denotes a peripheral interface that enables mutual accesses to peripheral devices.

Figure 3:
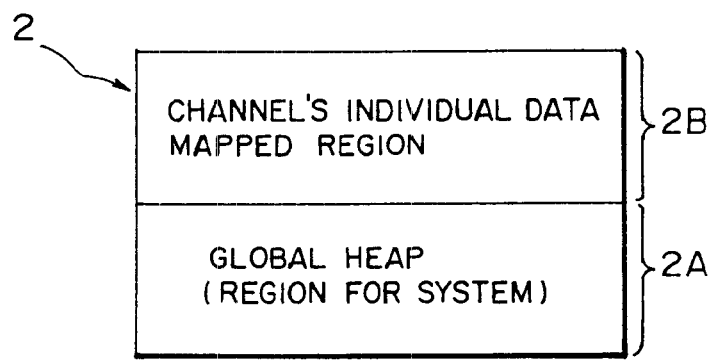
FIG. 3 is a schematic diagram for illustrating a memory structure (memory regions) of a data memory according to the embodiment.

The data memory (memory unit) 2 stores data necessary in various arithmetic processing in the MAC·ALU 3. According to this embodiment, the data memory 2 has, as shown in FIG. 3, for example, a global heap (region for system) 2A and a channel's individual data mapped region 2B. The global heap 2A is a region (for single-channel processing) that can be commonly used by a plurality of channels (#1 to #N: N is an integer not less than 2) including an interruption process and the like by the system (from the outside) The channel's individual data mapped region 2B is a region for holding channel's individual data of each channel #i (i=1 to N) at the time of the multi-channel processing.

The MAC·ALU (signal processing unit for single-channel) 3 implements various arithmetic processing (signal processing) such as an operation of multiplication and addition, and the like by a multiplier and an adder (not shown) using a memory region (the global heap 2A or the channel's individual data mapped region 2B) of the data memory 2 under control of the PEC unit 7 (signal processing program for single-channel).

The AGU 4 generates a memory address (read/write address) for the data memory 2. According to this embodiment, the AGU 4 operates under control of the PEC unit 7 (signal processing program for single-channel), thereby calculating (generating) a (first) memory address (single-channel address map) for the single-channel processing (for the global heap 2A).

The AGU 4 can generate two systems of the above memory addresses (single-channel address map) for multiplier data and multiplicand data to be used by the above multiplier in the MAC·ALU 3, as shown in FIG. 2.

The pointer adding unit 4 adds a pointer value Ptr(j) (j=0 to N−1) indicating the head (address) of an unused memory region of the data memory 2 (channel's individual data mapped region 2B) to each memory address generated by the AGU 4 each time the signal processing in the MAC·ALU 3 is completed to generate a (second) memory address (multi-channel address map) for the channel's individual data mapped region 2B. For this purpose, the pointer adding unit 4 comprises adders 5A and 5B.

The above pointer value Ptr (j) may be prepared independent of the AUG 4, or may be a normal pointer value held in a register (not shown) in the AGU 4. According to this embodiment, when processing of a certain channel #i is completed, the above pointer value Ptr(j) is such updated as to indicate an address next to the final address in a memory region used in that processing under control of the PEC unit 7, in either case. Incidentally, the pointer value Ptr(j) may be held for each channel #i, or one pointer value Ptr(j) (for example, held in the global heap 2A) is commonly used for all channels #i (updated each time the processing is terminated).

Figure 4:
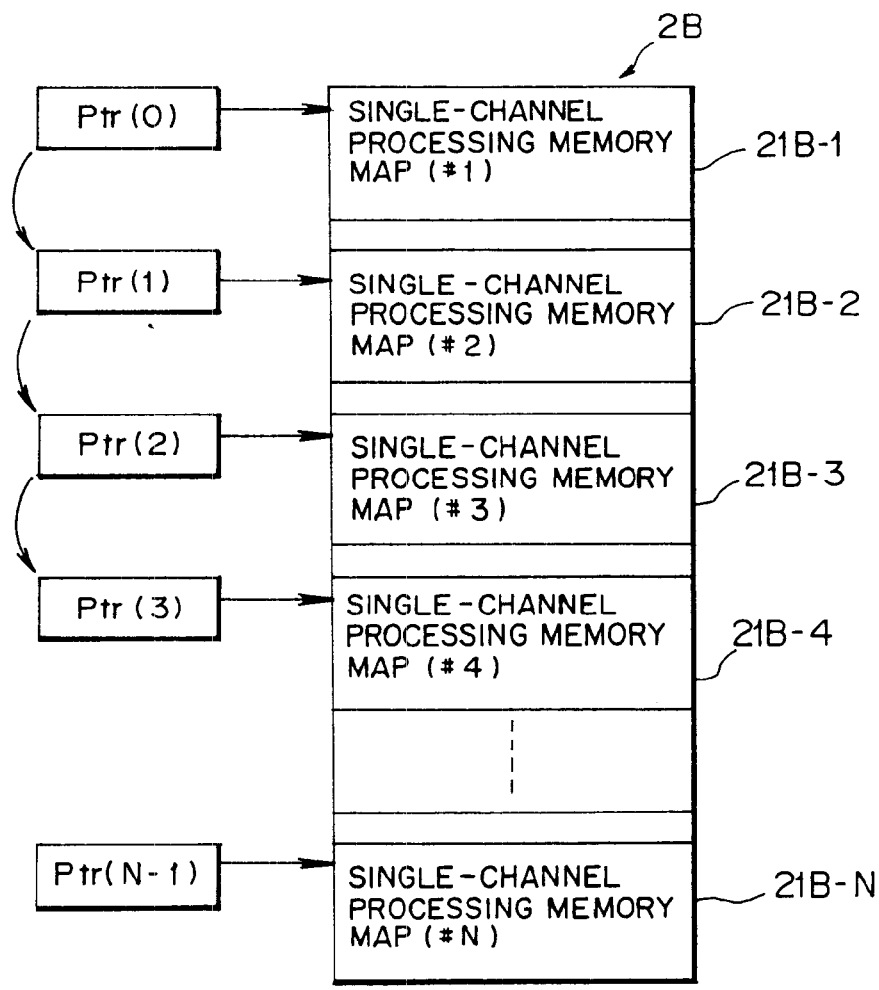
FIG. 4 is a schematic diagram for illustrating an operation of updating a pointer value according to the embodiment.

As schematically shown in, for example, FIG. 4, the pointer value Ptr(j) is updated each time the channel processing in the MAC·ALU 3 is completed. Addition of the pointer value Ptr(j) allows a channel's individual data region (memory use region) 21B-i to be such arranged as not to be overlapped with a channel's individual data region 21B-i of another channel #i in the channel's individual data arranged region 21B.

A memory address (multi-channel address map) at this time is obtained by adding a pointer value Ptr(j) to a memory address (single-channel address map) generated by the AGU 4, so that a memory address (address map) in each of the channel's individual data region 21B-i is equivalent to the single-channel address map.

Next, the address selecting unit 6 selects either a memory address generated by the AGU 4 or a memory address obtained by adding a pointer value Ptr(j) to that memory address by the pointer adding unit 5 (adder 5A or 5B) as above as a real address for the data memory 2. For this purpose, the address selecting unit 6 comprises selectors 6A and 6B in two systems correspondingly to the adders 5A and 5B.

In concrete, when an access is made to the global heap 2A (at the time of interruption process by the system or the like), outputs of the selectors 6A and 6B are switched to the side of the AGU 4, so that a memory address (single-channel address map) generated by the AGU 4 is selected as it is as a real address. When an access is made to the channel's individual data arranged region 2B, the outputs of the selectors 6A and 6B are switched to the side of the adders 5A and 5B, so that a memory address after addition of the pointer value ptr(j) (multi-channel address map) is selected as a real address.

In setting a switching of a region 2A and 2B that is an object of the access (address selection), the PEC unit 7 implements an access setting (single/multi-channel processing) on the AGU 4, and the AGU 4 sets the most significant bit (MSB) of the memory address to "L(0)"/"H (1)" according to the access setting, according to this embodiment. The AGU 4 according to this embodiment sets setting information ("L"/"H") indicating the single/multi-channel processing setting at the MSB of the memory address.

In concrete, at the time of a setting of the single-channel processing (at the time of an access to the global heap 2A), the MSB of a generated memory address is set to "L", while at the time of the multi-channel processing, the MSB of a generated memory address is set to "H", for example. Whereby, the selectors 6A and 6B determine an access to the global heap 2A when the MSB of a memory address generated by the AGU 4 is "L", and select the memory address generated by the AGU 4. To the contrary, when the MSB of the memory address generated by the AGU 4 is "H", the selectors 6A and 6B determine an access to the channel's individual data mapped region 2B, and select a memory address after added a pointer value Ptr(j).

By selecting either a memory address before added a pointer value Ptr (j) or a memory address after added a pointer value Ptr(j), the multi-channel DSP 1 according to this embodiment accomplishes the processing (single-channel processing): function common to every channel #i and the multi-channel processing function without adding a large modification to the program for the single-channel processing.

The PEC unit 7 controls signal processing in the MAC·ALU 3, generation of memory addresses as described above in the AGU 4, updating of the pointer value Ptr(j), etc., according to the signal processing program (instruction set) for single-channel stored (described) in the instruction memory 8 to collectively control the signal processing in the DSP 1.

The interface 9 interfaces between an input-output of the DSP 1 and peripheral devices in the outside through the peripheral interface 13. The interface 10 interfaces between an input-output of the DSP 1 and the external memory through the external memory interface 12. Signals such as voice and the like that are objects of the processing are inputted to the MAC·ALU 3 through the interface 9 or 10.

Figure 5:
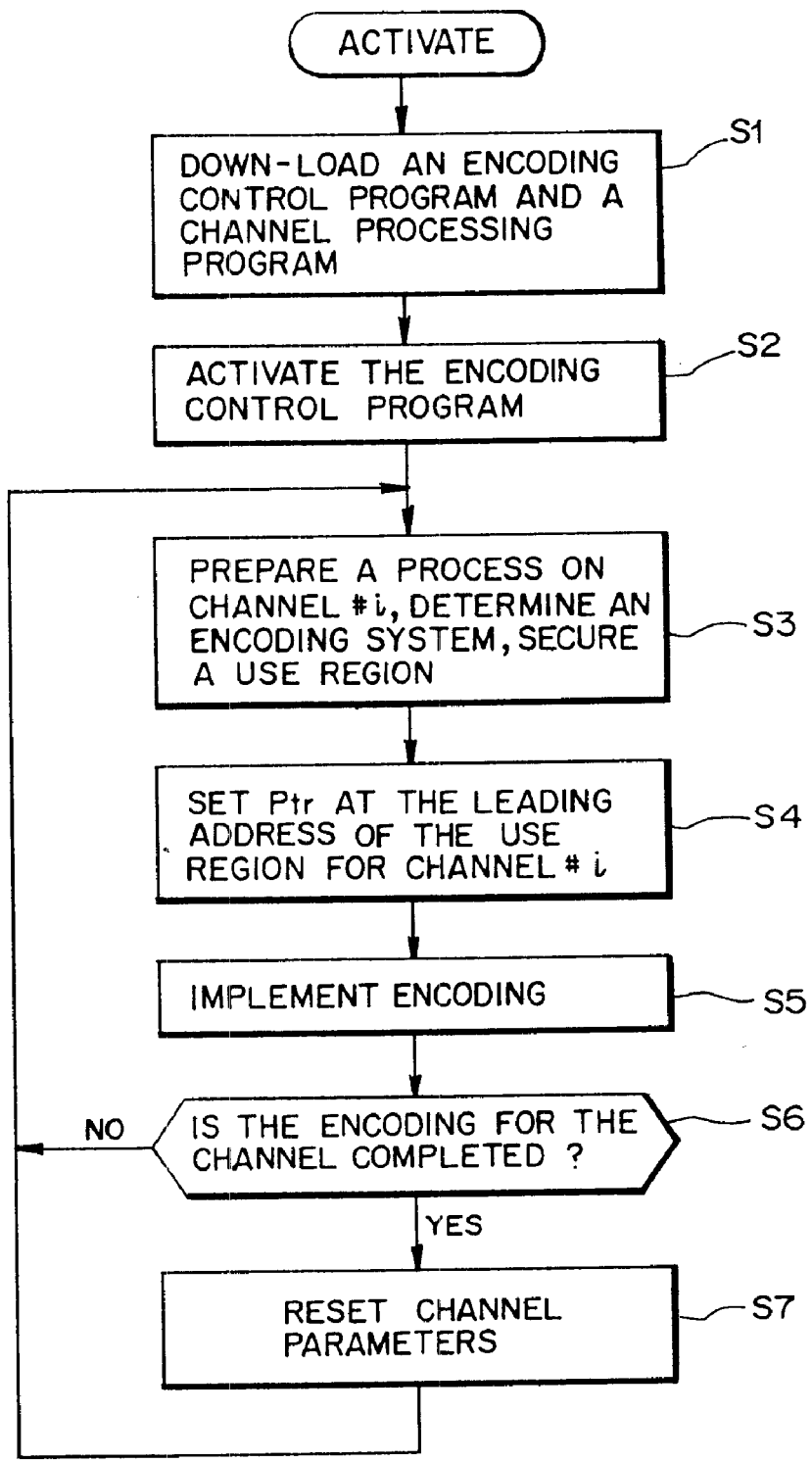
FIG. 5 is a flowchart for illustrating an operation of the multi-channel DSP according to the embodiment.

Hereinafter, an operation of the DSP 1 according to this embodiment with the above structure will be described with reference to a flowchart (steps S1 to S7) shown in FIG. 5.

When the DSP 1 is activated, programs (here, an encoding control program and a channel processing program, for example) necessary in the signal processing (single-channel) are stored (down-loaded) in the instruction memory 8 through the external memory interface 12 (the interface 10) and the peripheral interface 13 (the interface 9) (step S1) When the PEC unit 7 is activated, and the above encoding control program is activated (step S2), the PEC unit 7 operates according to the encoding control program, thereby preparing a process on the channel #1, determining an encoding system for input signals, securing a memory use region 21B-i in the data memory 2 (channel's individual data mapped region 2B) for the signal processing (instructing the AGU 4 to generate an address), etc., (step S3).

At this time, the PEC unit 7 instructs the AGU 4 to set the MSB of a generated address to "H" so long as there is no need to implement processing common to every channel #i (processing using the global heap 2A) such as an interruption by the system or the like.

The PEC unit 7 next sets the pointer value Ptr(j) at the leading address in the secured channel's individual data region 21B-i (the initial value is set at the leading address in the channel's individual data mapped region 2B) (step S4) The pointer adding unit 5 (the adders 5A and 5B) thus adds the pointer value ptr(j) to the memory address generated by the AGU 4.

Next, either a memory address generated by the AGU 4 or a memory address obtained by adding a pointer value ptr(j) to the memory address is selected as a real address by the address selecting unit 6. Since the MSB of the memory address generated by the AGU 4 is now "H", the memory address obtained by adding the pointer value Ptr(j) is selected as a real address, and provided to the data memory 2.

The MAC·ALU 3 implements the signal processing [encoding process (operation of multiplication and addition, and the like)] using a memory area (channel's individual data region 21B-i) having a leading address indicated by the memory address obtained by adding the pointer value Ptr(j) selected by the address selecting unit 6 (step S5).

When the signal processing in the MAC·ALU 3 is completed thereafter, the PEC unit 7 confirms whether the processed channel #i is the final channel #N or not (step S6). When the channel #i is not the final channel #N, the PEC unit 7 repeatedly carries out the process from the above step S3 until the process on the final channel #N is completed (NO route at step S6).

Namely, until the process on the final channel #N is completed, the pointer value Ptr(j) is such updated as to indicate the leading address of a memory use region 21B-i in the channel's individual data mapped region 2B each time the processing of a channel #i is completed, whereby the channel's individual data regions 21B-i for all channels #i are dynamically arranged such as to avoid duplication (interference) thereof, and the encoding process is implemented.

Assuming that encoding systems applied to the channels #1 to #4 are (a) to (d), respectively, and that the encoding system (a) requires a memory region (channel's individual data region 21B-1) of n words, the encoding system (b) requires a memory region (21B-2) of m words and the encoding systems (c) and (d) require memory regions (21B-3 and 21B-4) of k words. Incidentally, the above n, m and k may be integers differing from one another, or a part or all of n, m and k may be the same value.

Figure 6:
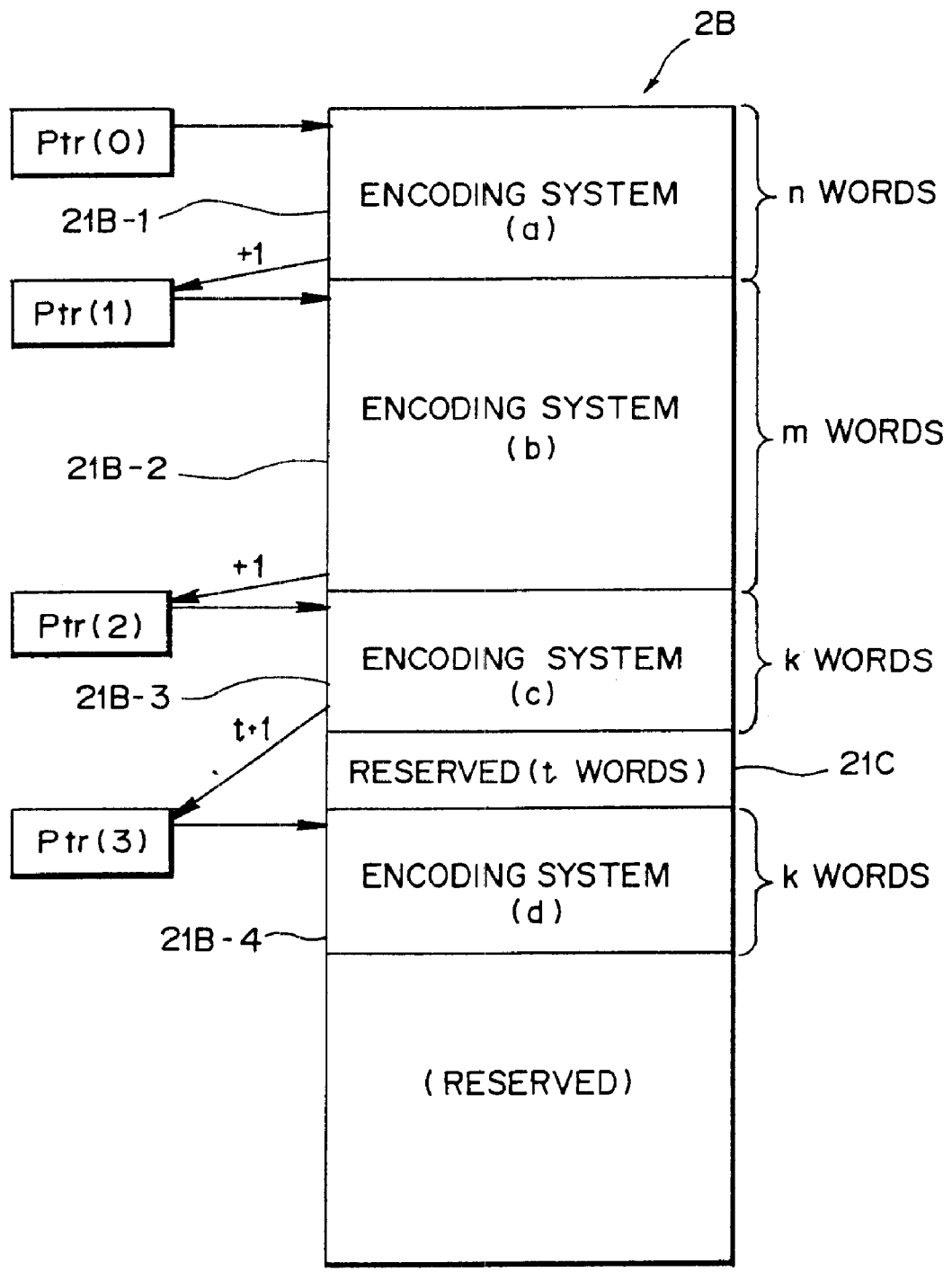
FIG. 6 is a schematic diagram for illustrating an operation of updating a pointer value according to the embodiment.

In this case, the pointer value Ptr(j) is updated as shown in, for example, FIG. 6. Namely, the pointer value Ptr(0) is such set as to indicate the leading address of a channel's individual data arranged region 2B when the first channel #1 is processed, then an encoding process in the encoding system (a) is implemented using a channel's individual data region 21B-1 of n words counted from the leading address.

When the channel #2 is processed, the pointer value Ptr(1) is such set as to indicate the next address obtained by adding 1 to the final address of the channel's individual data region 21B-1, and an encoding process in the encoding system (b) is implemented using the channel's individual data region 21B-2 of m words counted from that address.

Similarly, when the channel #3 is processed, the pointer value Ptr(2) is such set as to indicate the next address obtained by adding 1 to the final address of the channel's individual data region 21B-2, and an encoding process in the encoding system (c) is implemented using the channel's individual data region 21B-3 of k words counted from that address.

As shown in FIG. 6, assuming that a reserved region 21C of t words exists after the channel's individual data region 21B-3 for the channel #3, for example. In such case, when the channel #4 is processed, the pointer value Ptr(3) is such set as to avoid the reserved region 21C. In other words, the pointer value Ptr(3) is such set as to indicate an address obtained by adding (t+1) to the final address of the channel's individual data region 21B-3. Whereby, the channel's individual data region 21B-4 for processing the channel #4 of k words counted from the next address of the reserved area 21C is secured.

Thereafter, the channel's individual data region 21B-i for a channel #i is successively arranged in the channel's individual data arranged region 2B such as not to duplicate with one another and as to avoid the reserved area 21C, and an encoding process on each channel #i is implemented using the channel's individual data region 21B-i in the similar manner.

When an encoding of the final channel #N is completed (when it is judged YES at step S6 in FIG. 5), the PEC unit 7 resets (initializes) various parameters (channel parameters) for processing a channel #i including the above pointer value Ptr(j) (step S7). Whereby, the encoding process from the first channel #1 is carried out in the similar manner to the above.

Meanwhile, when the memory address generated by the AGU 4 is "L", it means an access to the global heap 2A including an access by the system process such as an interruption process or the like. For this, the address selecting unit 6 selects an output of the AGU 4 as it is as a real address.

As above, the DSP 1 according to this embodiment selects a memory address (multi-channel address map) obtained by adding a pointer value Ptr (j) indicating the head of a memory use region 21B-i in the data memory 2 (channel's individual data arranged region 2B) to a memory address (single-channel address map) generated by the AGU 4 as a real address, thereby enjoying the following advantages.

① Address maps at the time of single-channel processing and multi-channel processing are identical when seen from the program creator (it is unnecessary to add any modification to the signal processing program for single-channel). Therefore, it is possible to implement the multi-channel processing using the program for single-channel as it is, so that a highly-reliable, efficient DSP 1 is realized at a low cost.

② By updating the pointer value Ptr(j), a memory use region 21B-i in a size necessary for each channel #i is successively arranged. For this, even when a size of the memory use region 21B-i necessary for each channel #i is different, it is possible to avoid in advance an interference problem of the memory use region 21B-i without paying attention to detailed region arrangement (memory allocation) when the program is created.

③ Copying and copying-back of data as implemented heretofore are unnecessary, and there is no decrease of the processing efficiency due to multi-channelization.

On the other hand, when processing common to every channel or a system process due to an interruption process or the like is carried out, a memory address (single-channel address map) generated by the AGU 4 is selected as it is as a real address of the data memory 2, and the memory use region is fixed to the global heap 2A (a region other than a memory use region 21B-i). Therefore, it is possible to cope with the processing common to every channel #i that is unnecessary to be implement on each channel #i without adding any modification to the program for the single-channel processing.

Such selection (switching) of a memory address is realized by using the MSB ("H"/"L") of a memory address generated by AGU 4. The address selecting unit 6 (selectors 6A and 6B) can thereby select an address in the above-described manner only by referring to the MSB of that memory address, which enables a control on switching between the processing common to every channel #i and the multi-channel processing.

Incidentally, setting information for such address selection is not necessarily the MSB. If high-order several bits of a memory address generated by the AGU 4 are used, it is possible to change a boundary between the global heap 2A and the channel's individual data region 21B-i.

In the above embodiment, the pointer value Ptr(j) is such updated that the channel's individual data region 21B-i are successively arranged without a space therebetween. So long as the memory interference problem can be avoided, their arranged positions and the order of their arrangement can be ignored [it is sufficient to set a value indicating the head of an unused region to the pointer value Ptr(j)].

Further, the above address selecting unit 6 may be omitted. Namely, it is possible to always select one obtained by adding a pointer value Ptr(j) to a memory address generated by the AGU 4 as a real address for the data memory 2. In such case, a multi-channel processing similar to the above is possible by updating (setting) the pointer value Ptr(j) in the manner described above.

Note that this invention is not limited to the above example, but may be modified in various ways without departing from the scope of the invention.

What is claimed is:

1. A multi-channel signal processing apparatus comprising:

a memory unit;

a signal processing unit, for single-channel and shared with multi-channel signals, to process the individual multi-channel signals using a memory region of said memory unit according to a signal processing program for single-channel;

an address generation unit to generate a first memory address for a first memory region of said memory unit, which region is used for common signal processing common to the multi-channel signals according to said signal processing program;

a pointer adding unit to add a pointer value indicating the head of an unused memory region of a second memory region of said memory unit, which region is used for individual signal processing independent for the individual multi-channel signals, to said first memory address generated by said address generation unit each time the single-channel signal processing in the signal processing unit is completed so as to generate a second memory address; and an address selecting unit to select either said first memory address or said second memory address as a real address for said memory unit according to whether the signal processing to be implemented in said signal processing unit is the common signal processing or the individual signal processing.

2. The multi-channel signal processing apparatus according to claim 1, wherein said address generation unit sets setting information indicating a setting of the single or multi-channel processing at said first memory address according to said signal processing program; and said address selecting unit implements said address selection according to said setting information set at said first memory address.

3. The multi-channel signal processing apparatus according to claim 2, wherein said address generation unit sets said setting information at the most significant bit of said first memory address.

4. A multi-channel signal processing apparatus comprising:

a memory unit;

a signal processing unit, for single-channel and shared with multi-channel signals, to process the individual multi-channel signals using a memory region of said memory unit, which region is used for individual signal processing independent for the individual multi-channel signals, according to a signal processing program for single-channel;

an address generation unit to generate a first memory address for a first memory region of said memory unit, which region is used for common signal processing common to the multi-channel signals according to said signal processing program; and a pointer adding unit to provide a second memory address obtained by adding a pointer value indicating the head of an unused memory region of a second memory region of said memory unit, which region is used for individual signal processing independent for the individual multi-channel signals, to said first memory address generated by said address generation unit each time the single-channel signal processing in said signal processing unit is completed as a real address for said memory unit.

* * * * *